United States Patent
Aiba

(10) Patent No.: US 8,369,034 B2
(45) Date of Patent: Feb. 5, 2013

(54) LENS APPARATUS FOR SURVEILLANCE CAMERA

(75) Inventor: Daigo Aiba, Saitama (JP)

(73) Assignee: Fujifilm Corporation, Tokyo (JP)

( * ) Notice: Subject to any disclaimer, the term of this patent is extended or adjusted under 35 U.S.C. 154(b) by 82 days.

(21) Appl. No.: 13/015,605

(22) Filed: Jan. 28, 2011

(65) Prior Publication Data
US 2011/0181970 A1    Jul. 28, 2011

(30) Foreign Application Priority Data
Jan. 28, 2010   (JP) ................ 2010-017175

(51) Int. Cl.
G02B 7/02    (2006.01)
(52) U.S. Cl. ............ 359/819; 359/829; 359/830
(58) Field of Classification Search .......... 359/694–704, 359/811–830
See application file for complete search history.

(56) References Cited

U.S. PATENT DOCUMENTS

| 6,285,416 B1 | 9/2001 | Mitchell et al. | |
| 7,042,660 B2* | 5/2006 | Sugita et al. | 359/818 |
| 7,460,319 B2 | 12/2008 | Aiba et al. | |
| 2007/0024989 A1* | 2/2007 | Kageyama | 359/699 |

FOREIGN PATENT DOCUMENTS

| EP | 1 857 850 A2 | 11/2007 |
| JP | 2004-054186 | 2/2004 |
| JP | 2007-310228 | 11/2007 |

OTHER PUBLICATIONS

European Search Report—EP 11 15 2304—May 18, 2011.

* cited by examiner

Primary Examiner — Mohammed Hasan
(74) Attorney, Agent, or Firm — Young & Thompson

(57) ABSTRACT

A lens apparatus for a surveillance camera. The apparatus includes an operation ring which is rotatably provided on an outer periphery of a lens barrel body, a threaded hole being formed in an outer peripheral surface of the operation ring. The apparatus also includes a cover which is provided on the lens barrel body to cover an outer periphery of the operation ring, a slit which is circumferentially formed in a peripheral surface of the cover. The apparatus further includes a knob which has a body part and a threaded part and is attached to the operation ring by screwing the threaded part into the threaded hole through the slit. The operation ring is locked by tightening the knob and holding the cover between the operation ring and the body part of the knob.

8 Claims, 5 Drawing Sheets

LENS APPARATUS FOR SURVEILLANCE CAMERA

BACKGROUND OF THE INVENTION

1. Field of the Invention

The present invention relates to a lens apparatus for a surveillance camera, and more particularly, to a lens apparatus for a surveillance camera where a locking mechanism is provided in an operation ring which effects zooming or focusing.

2. Description of the Related Art

In lens apparatuses for surveillance cameras where zooming and focusing are manually performed, locking mechanisms are provided in zoom and focus operation rings such that set zoom and focus positions are not moved.

A conventional locking mechanism locks an operation ring by inserting a knob screwed on an outer peripheral part of the operation ring toward a lens barrel body and thereby pressing a distal end part of the knob against an outer peripheral surface of the lens barrel body (for example, Japanese Patent Application Laid-Open No. 2007-310228).

When the operation ring is locked by pressing the distal end part of the knob against the outer peripheral surface of the lens barrel body as described above, the lens barrel body is deformed, thereby affecting the optical performance.

Japanese Patent Application Laid-Open No. 2004-54186 discloses a method for locking an operation ring by attaching a stopper plate to a distal end of a knob screwed on an outer periphery of the operation ring, and pressing the stopper plate against an inner wall surface of a groove formed in a lens barrel body.

However, the method disclosed in Japanese Patent Application Laid-Open No. 2004-54186 has a disadvantage that it is complicated to assemble the apparatus since a shaft part is formed at a distal end of a threaded part formed on the knob and the stopper plate is rotatably supported on the shaft part.

SUMMARY OF THE INVENTION

The present invention has been made in view of such circumstances, and it is an object of the invention to provide a lens apparatus for a surveillance camera which is easily assembled, and which can reliably lock an operation ring without deforming a lens barrel or the like.

In order to achieve the above object, an invention according to a first aspect of the present invention is a lens apparatus for a surveillance camera where an operation ring is rotatably provided on an outer periphery of a lens barrel body, including: a cover which is provided on the lens barrel body to cover an outer periphery of the operation ring; a threaded hole which is formed in an outer peripheral surface of the operation ring; a slit which is circumferentially formed in a peripheral surface of the cover; and a knob which has a body part and a threaded part and is attached to the operation ring by screwing the threaded part into the threaded hole through the slit, wherein the operation ring is locked by tightening the knob and holding the cover between the operation ring and the body part of the knob.

With the present invention, the outer periphery of the operation ring is covered by the cover, and the knob is screwed on the operation ring through the slit formed in the cover. When the knob is tightened, the cover is held between the body part of the knob and the operation ring. The operation ring is thereby locked. The operation ring is unlocked by loosening the knob. In the present invention, the operation ring is locked by holding the cover as described above. Thus, the lens barrel body is not deformed even when the operation ring is locked. The lens apparatus can be easily assembled by simply screwing the threaded part of the knob into the threaded hole formed in the operation ring through the slit formed in the cover.

In order to achieve the above object, an invention according to a second aspect of the present invention is a lens apparatus for a surveillance camera where a first operation ring and a second operation ring are rotatably provided on an outer periphery of a lens barrel body, including: a cover which is provided on the lens barrel body to cover an outer periphery of the first operation ring and an outer periphery of the second operation ring; a first threaded hole which is formed in an outer peripheral surface of the first operation ring; a second threaded hole which is formed in an outer peripheral surface of the second operation ring; a first slit which is circumferentially formed in a peripheral surface of the cover; a second slit which is circumferentially formed in the peripheral surface of the cover; a first knob which has a body part and a threaded part and is attached to the first operation ring by screwing the threaded part into the first threaded hole through the first slit; and a second knob which has a body part and a threaded part and is attached to the second operation ring by screwing the threaded part into the second threaded hole through the second slit, wherein the first operation ring is locked by tightening the first knob and holding the cover between the first operation ring and the body part of the first knob, and the second operation ring is locked by tightening the second knob and holding the cover between the second operation ring and the body part of the second knob.

With the present invention, the two operation rings (the first operation ring and the second operation ring) are provided on the lens barrel body, and the outer peripheries of the operation rings are covered by the common cover. The first and second knobs are screwed through the first and second slits formed in the cover, respectively. When the first knob is tightened, the cover is held between the body part of the first knob and the first operation ring. The first operation ring is thereby locked. Similarly, when the second knob is tightened, the cover is held between the body part of the second knob and the second operation ring. The second operation ring is thereby locked. The first operation ring is unlocked by loosening the first knob. The first operation ring can be thereby rotationally operated. Similarly, the second operation ring is unlocked by loosening the second knob. The second operation ring can be thereby rotationally operated. In the present invention, the first and second operation rings are locked by holding the cover as described above. Thus, the lens barrel body is not deformed even when the first and second operation rings are locked. The lens apparatus can be easily assembled by simply screwing the threaded parts of the first and second knobs into the first and second threaded holes formed in the first and second operation rings through the first and second slits formed in the cover.

With the present invention, the operation ring can be reliably locked without deforming the lens barrel or the like. Also, the lens apparatus can be easily assembled.

DETAILED DESCRIPTION OF THE PREFERRED EMBODIMENTS

In the following, a preferred embodiment of a lens apparatus for a surveillance camera according to the present invention will be described in detail by reference to the accompanying drawings.

[Entire Configuration]

Figure 1:
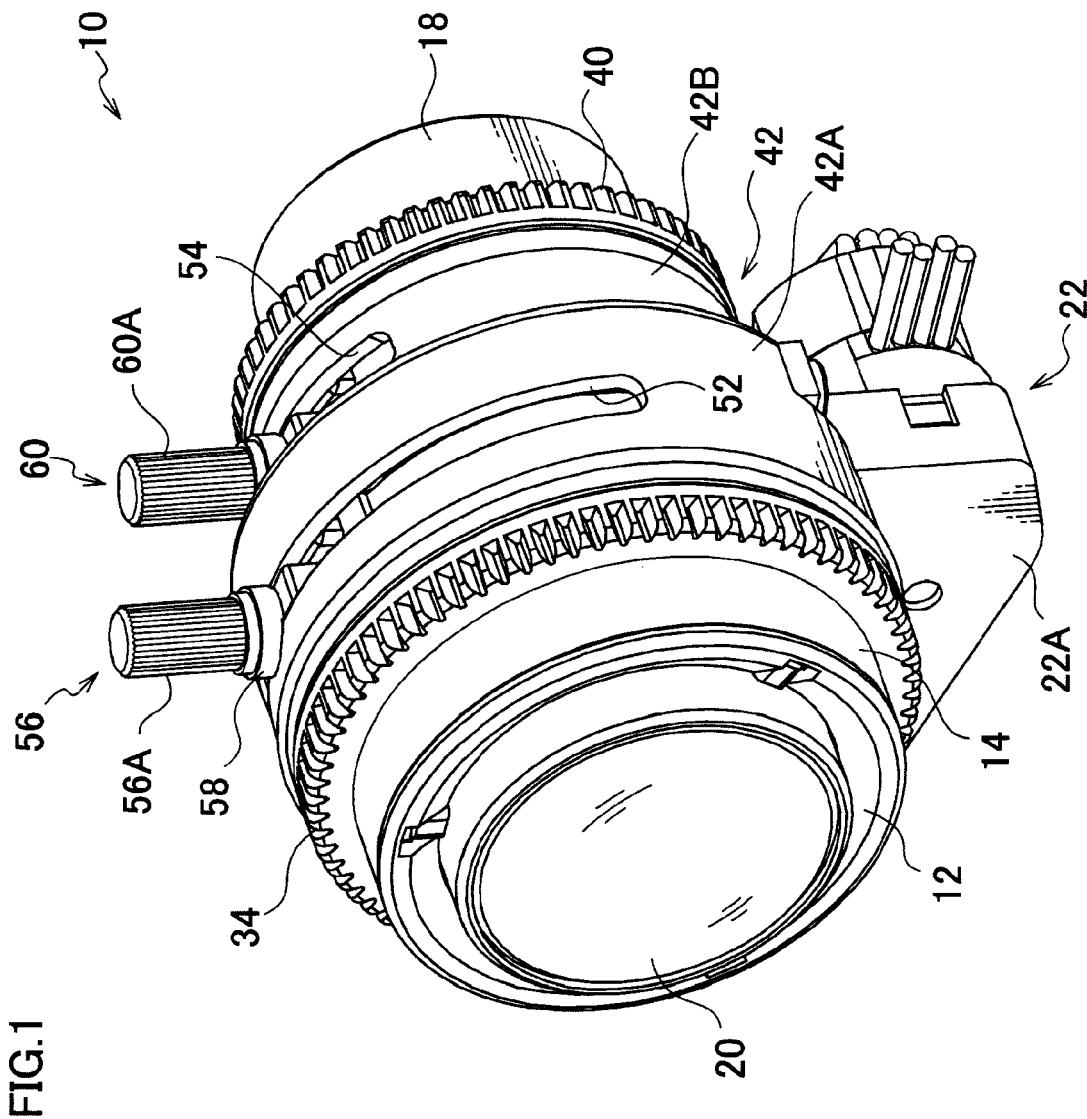
FIG. 1 is an elevational perspective view of a lens apparatus for a surveillance camera.
Figure 2:
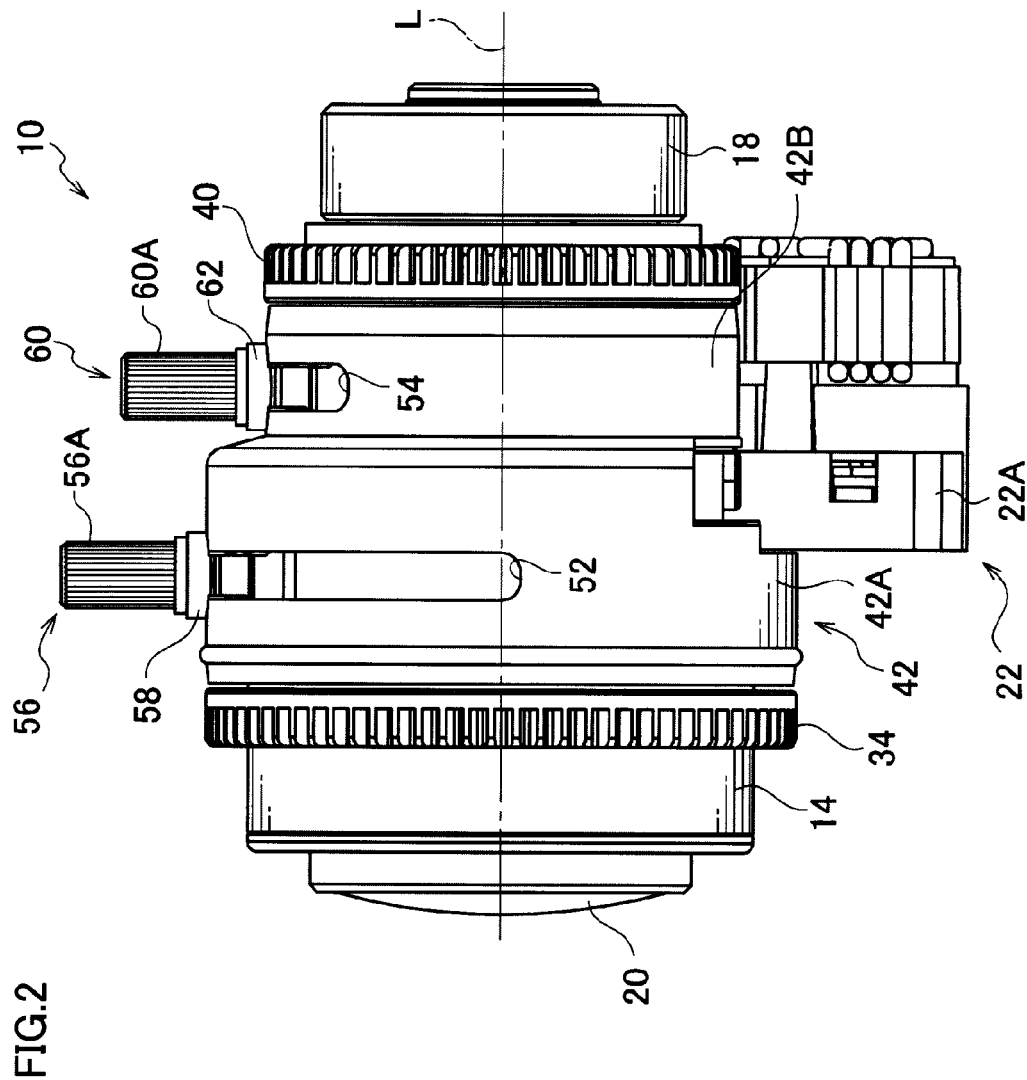
FIG. 2 is a side view of the lens apparatus for a surveillance camera.
Figure 3:
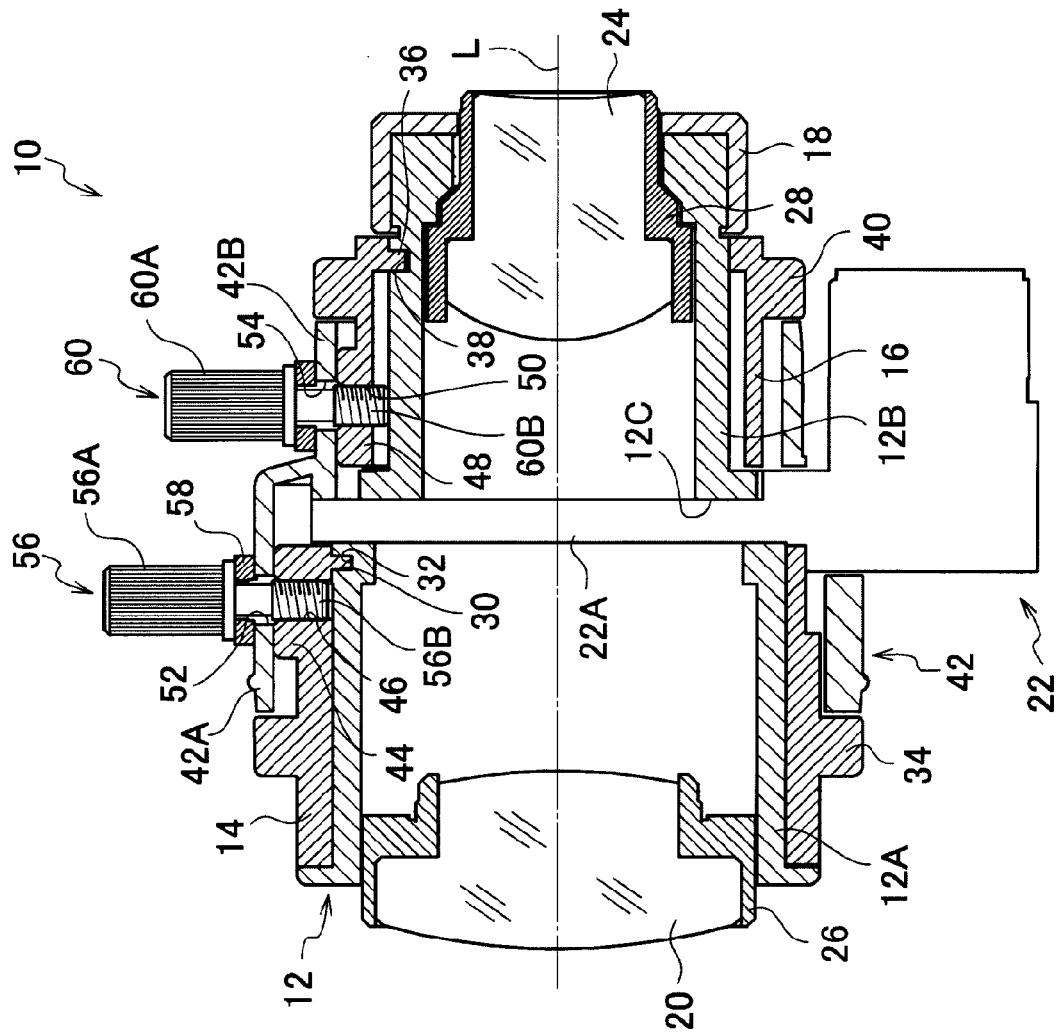
FIG. 3 is a side sectional view of the lens apparatus for a surveillance camera.
Figure 4:
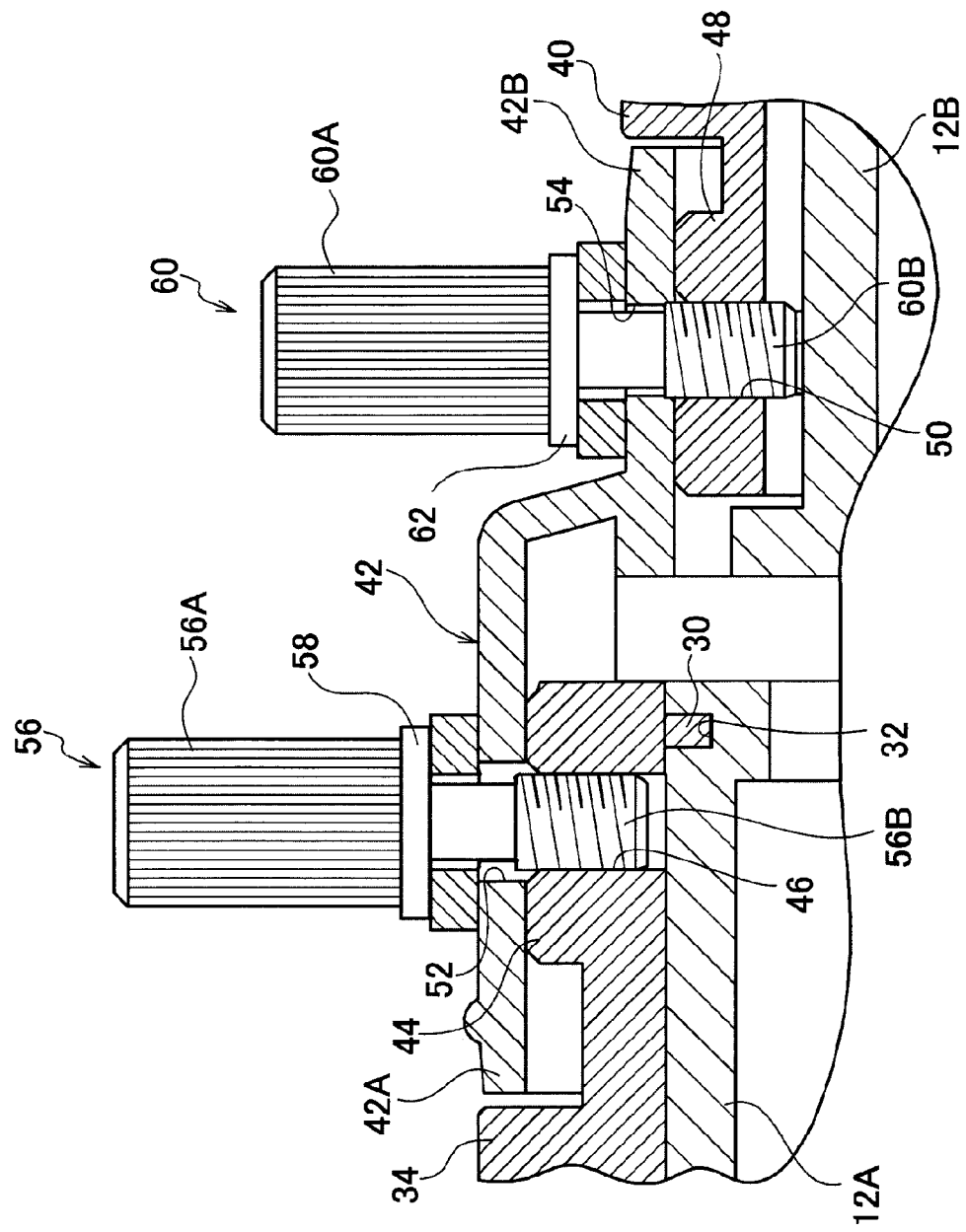
FIG. 4 is a main part enlarged view of FIG. 3.

FIGS. 1 to 3 are an elevational perspective view, a side view, and a side sectional view illustrating an embodiment of a lens apparatus for a surveillance camera according to the present invention, respectively. FIG. 4 is a main part enlarged view of FIG. 3.

A lens apparatus 10 for a surveillance camera is a lens apparatus for a surveillance camera where zooming and focusing operations are manually performed.

A zoom ring 14 which effects the zooming operation, and a focus ring 16 which effects the focusing operation are rotatably provided on an outer peripheral part of a lens barrel body 12.

The lens barrel body 12 includes a lens barrel body large diameter part 12A having a large diameter, and a lens barrel body small diameter part 12B having a small diameter. The entire lens barrel body 12 is formed in a cylindrical shape. The zoom ring 14 is provided rotatably within a certain angular range on an outer periphery of the lens barrel body large diameter part 12A at the front stage. The focus ring 16 is provided rotatably within a certain angular range on an outer periphery of the lens barrel body small diameter part 12B at the rear stage.

A mounting ring 18 is attached to a rear end part of the lens barrel body 12. The lens apparatus 10 for a surveillance camera is fitted to a surveillance camera body (not shown) via the mounting ring 18.

A zoom lens 20, an iris unit 22, and a focus lens 24 are arranged sequentially from the front side along an optical axis L inside the lens barrel body 12.

The zoom lens 20 is held in a zoom lens frame 26, and accommodated inside the lens barrel body large diameter part 12A.

The zoom lens frame 26 is formed in a cylindrical shape. Unillustrated three zooming cam pins are provided projecting on an outer peripheral part of the zoom lens frame 26. Unillustrated three zooming linear grooves are formed parallel to the optical axis L in a peripheral surface of the lens barrel body large diameter part 12A corresponding to the three zooming cam pins. Three zooming cam grooves are also formed in an inner peripheral surface of the zoom ring 14. The three zooming cam pins of the zoom lens frame 26 which is accommodated inside the lens barrel body large diameter part 12A are inserted through the zooming linear grooves, and fitted into the zooming cam grooves, respectively. Accordingly, when the zoom ring 14 is rotationally operated, the zoom lens 20 held in the zoom lens frame 26 reciprocates along the optical axis L. When the zoom lens 20 reciprocates along the optical axis L, a focal length of the lens apparatus 10 for a surveillance camera is changed.

The focus lens 24 is held in a focus lens frame 28, and accommodated inside the lens barrel body small diameter part 12B.

The focus lens frame 28 is formed in a cylindrical shape. Unillustrated three focusing cam pins are provided projecting on an outer peripheral part of the focus lens frame 28. Unillustrated three focusing linear grooves are formed parallel to the optical axis L in a peripheral surface of the lens barrel body small diameter part 12B corresponding to the three focusing cam pins. Three focusing cam grooves are also formed in an inner peripheral surface of the focus ring 16. The three focusing cam pins of the focus lens frame 28 which is accommodated inside the lens barrel body small diameter part 12B are inserted through the focusing linear grooves, and fitted into the focusing cam grooves, respectively. Accordingly, when the focus ring 16 is rotationally operated, the focus lens 24 held in the focus lens frame 28 reciprocates along the optical axis L. When the focus lens 24 reciprocates along the optical axis L, an in-focus position of the lens apparatus 10 for a surveillance camera is changed.

The iris unit 22 has a body frame 22A formed in a plate-like shape. An iris device and an iris meter (not shown) are mounted on the body frame 22A. An iris unit fitting part 12C is formed opening in a slit shape in the lens barrel body small diameter part 12B to fit the iris unit 22 thereto. The iris unit 22 is attached to the lens barrel body 12 by inserting the body frame 22A into the lens barrel body 12 from the iris unit fitting part 12C, and screwing the body frame 22A on the lens barrel body 12 with an unillustrated screw. In the iris unit 22 attached to the lens barrel body 12, the iris device mounted on the body frame 22A is arranged on the optical axis L, and the iris meter is arranged outside the lens barrel body 12.

[Locking Mechanism for Zoom Ring and Focus Ring]

As described above, the zoom ring 14 and the focus ring 16 are provided rotatably within a certain angular range on the outer periphery of the lens barrel body 12. A locking mechanism which locks the ring at a desired position is provided in each of the zoom ring 14 and the focus ring 16. In the following, the locking mechanism for the zoom ring 14 and the focus ring 16 will be described.

The zoom ring 14 is formed in a cylindrical shape, and provided rotatably within a certain angular range on the outer periphery of the lens barrel body large diameter part 12A.

A zoom ring rotation guide pin 30 is formed radially projecting on an inner peripheral part of the zoom ring 14. Meanwhile, a zoom ring rotation guide groove 32 into which the zoom ring rotation guide pin 30 is fitted is formed in the outer periphery of the lens barrel body large diameter part 12A. The zoom ring rotation guide groove 32 is circumferentially formed within a certain angular range. When the zoom ring rotation guide pin 30 is fitted into the zoom ring rotation guide groove 32, the axial movement of the zoom ring 14 is restricted. The rotatable range thereof is also restricted to a certain range.

A zoom ring flange part 34 is formed on an outer peripheral part of the zoom ring 14 in the vicinity of an axial center part. The zoom ring flange part 34 is formed with a predetermined width in the axial direction, and a predetermined height in the radial direction. A plurality of grooves are circumferentially formed parallel to the optical axis L at regular pitches in an outer periphery of the zoom ring flange part 34. The rotation operation of the zoom ring 14 is performed using the zoom ring flange part 34.

The focus ring 16 is formed in a cylindrical shape, and is provided rotatably within a certain angular range on the outer periphery of the lens barrel body small diameter part 12B.

A focus ring rotation guide pin 36 is formed radially projecting on an inner peripheral part of the focus ring 16. Meanwhile, a focus ring rotation guide groove 38 into which the focus ring rotation guide pin 36 is fitted is formed in the outer periphery of the lens barrel body small diameter part 12B. The focus ring rotation guide groove 38 is circumferentially formed within a certain angular range. When the focus ring rotation guide pin 36 is fitted into the focus ring rotation guide groove 38, the axial movement of the focus ring 16 is restricted. The rotatable range thereof is also restricted to a certain range.

A focus ring flange part 40 is formed on an outer peripheral part of the focus ring 16 in the vicinity of an axial rear end part. The focus ring flange part 40 is formed with a predetermined width in the axial direction, and a predetermined height in the radial direction. A plurality of grooves are circumferentially formed parallel to the optical axis L at regular pitches in an outer periphery of the focus ring flange part 40. The rotation operation of the focus ring 16 is performed using the focus ring flange part 40.

Figure 5:
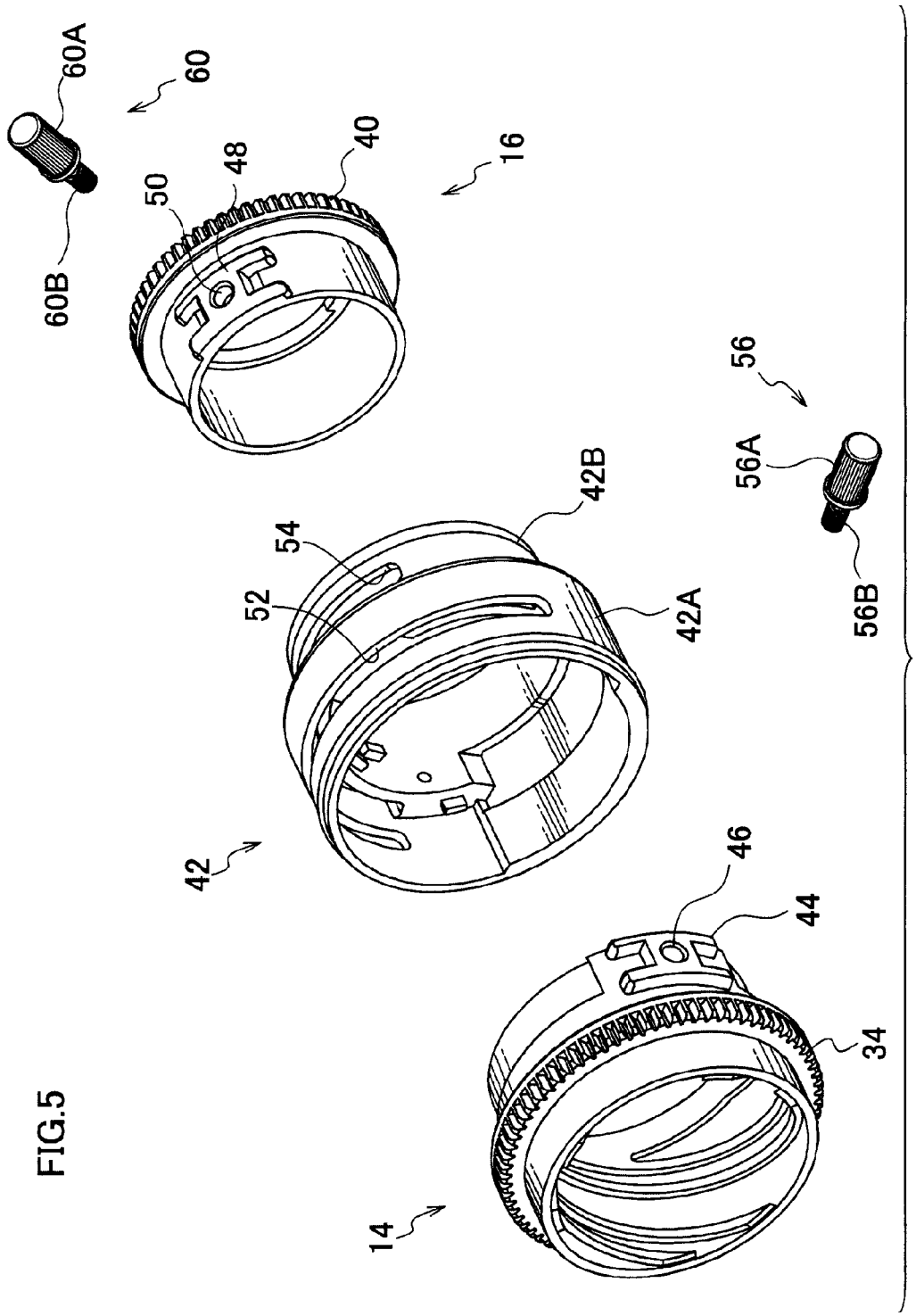
FIG. 5 is an exploded view of a zoom ring and a focus ring with respect to a cover.

A cylindrical cover 42 which covers the outer peripheries of the zoom ring 14 and the focus ring 16 is attached to the lens barrel body 12. The cover 42 includes a cover large diameter part 42A having a large diameter for covering the outer periphery of the zoom ring 14, and a cover small diameter part 42B having a smaller diameter for covering the outer periphery of the focus ring 16 as shown in FIG. 5. The cover 42 is screwed on the outer periphery of the lens barrel body 12 with an unillustrated screw.

When the cover 42 is attached to the lens barrel body 12, a part on the rear side from the zoom ring flange part 34 of the zoom ring 14 is covered by the cover large diameter part 42A, and a part on the front side from the focus ring flange part 40 of the focus ring 16 is covered by the cover small diameter part 42B.

The outer diameter of the cover large diameter part 42A is formed to be almost the same as the outer diameter of the zoom ring flange part 34. When the cover 42 is attached to the lens barrel body 12, an outer periphery of the cover large diameter part 42A and the outer periphery of the zoom ring flange part 34 are located almost flush with each other.

Meanwhile, the inner diameter of the cover large diameter part 42A is formed larger than the outer diameter of the zoom ring 14. When the cover 42 is attached to the lens barrel body 12, a predetermined gap is formed between an inner periphery of the cover large diameter part 42A and the outer periphery of the zoom ring 14.

The outer diameter of the cover small diameter part 42B is formed to be almost the same as the outer diameter of the focus ring flange part 40. When the cover 42 is attached to the lens barrel body 12, an outer periphery of the cover small diameter part 42B and the outer periphery of the focus ring flange part 40 are located almost flush with each other.

Meanwhile, the inner diameter of the cover small diameter part 42B is formed larger than the outer diameter of the focus ring 16. When the cover 42 is attached to the lens barrel body 12, a predetermined gap is formed between an inner periphery of the cover small diameter part 42B and the outer periphery of the focus ring 16.

A zoom ring locking convex part 44 having a predetermined shape (an H shape in the present embodiment: see FIG. 5) is formed projecting at a predetermined position in the circumferential direction at a rear end of the outer peripheral part of the zoom ring 14. The zoom ring locking convex part 44 is formed with a predetermined height from an outer peripheral surface of the zoom ring 14 such that a top surface thereof abuts against an inner peripheral surface of the cover large diameter part 42A. When the zoom ring 14 is rotationally operated, the zoom ring locking convex part 44 slides on the inner peripheral surface of the cover large diameter part 42A.

A zoom ring locking threaded hole 46 is radially formed in the center of the top surface of the zoom ring locking convex part 44. A threaded part of a zoom ring locking knob described below is screwed into the zoom ring locking threaded hole 46.

A focus ring locking convex part 48 having a predetermined shape (an H shape in the present embodiment: see FIG. 5) is formed projecting at a predetermined position in the circumferential direction at a front end of the outer peripheral part of the focus ring 16. The focus ring locking convex part 48 is formed with a predetermined height from an outer peripheral surface of the focus ring 16 such that a top surface thereof abuts against an inner peripheral surface of the cover small diameter part 42B. When the focus ring 16 is rotationally operated, the focus ring locking convex part 48 slides on the inner peripheral surface of the cover small diameter part 42B.

A focus ring locking threaded hole 50 is radially formed in the center of the top surface of the focus ring locking convex part 48. A threaded part of a focus ring locking knob described below is screwed into the focus ring locking threaded hole 50.

A zoom ring slit 52 is formed in the cover large diameter part 42A corresponding to the position of the zoom ring locking threaded hole 46 formed in the zoom ring 14. The zoom ring slit 52 is formed such that the threaded part of the zoom ring locking knob described below can be inserted therethrough. The zoom ring slit 52 is formed with a width slightly larger than that of the threaded part of the zoom ring locking knob. The zoom ring slit 52 is also formed circumferentially within an angular range corresponding to the moving range of the zoom ring locking threaded hole 46.

That is, since the zoom ring 14 is attached rotatably within a certain angular range to the lens barrel body 12 as described above, the position of the zoom ring locking threaded hole 46 is also moved within a certain angular range. The zoom ring slit 52 is formed within a predetermined angular range corresponding to the moving range of the zoom ring locking threaded hole 46 (the zoom ring slit 52 is formed from one end to the other end of the moving range of the zoom ring locking threaded hole 46).

The zoom ring slit 52 formed in the cover large diameter part 42A as described above is formed facing the zoom ring locking threaded hole 46.

A focus ring slit 54 is formed in the cover small diameter part 42B corresponding to the position of the focus ring locking threaded hole 50 formed in the focus ring 16. The focus ring slit 54 is formed such that the threaded part of the focus ring locking knob described below can be inserted therethrough. The focus ring slit 54 is formed with a width slightly larger than that of the threaded part of the focus ring locking knob. The focus ring slit 54 is also formed circumferentially within an angular range corresponding to the rotation range of the focus ring locking threaded hole 50. That is, since the focus ring 16 is attached rotatably within a certain angular range to the lens barrel body 12 as described above, the position of the focus ring locking threaded hole 50 is also moved within a certain angular range. The focus ring slit 54 is formed within a predetermined angular range corresponding to the moving range of the focus ring locking threaded hole 50 (the focus ring slit 54 is formed from one end to the other end of the moving range of the focus ring locking threaded hole 50).

The focus ring slit 54 formed in the cover small diameter part 42B as described above is formed facing the focus ring locking threaded hole 50.

A threaded part 56B of a zoom ring locking knob 56 is screwed into the zoom ring locking threaded hole 46 as described above. The zoom ring locking knob 56 includes a cylindrical knob body part 56A, and the threaded part 56B provided coaxially with the knob body part 56A at a proximal end part thereof. The threaded part 56B is formed corresponding to the zoom ring locking threaded hole 46, and has a smaller diameter than the knob body part 56A. The zoom ring locking knob 56 is attached to the zoom ring 14 by screwing the threaded part 56B into the zoom ring locking threaded hole 46. At this time, the zoom ring locking knob 56 has the threaded part 56B screwed into the zoom ring locking threaded hole 46 through the zoom ring slit 52. In the present embodiment, the zoom ring locking knob 56 is attached to the zoom ring 14 also via a spacer 58 formed in a ring shape.

Meanwhile, a threaded part 60B of a focus ring locking knob 60 is screwed into the focus ring locking threaded hole 50 as described above. The focus ring locking knob 60 includes a cylindrical knob body part 60A, and the threaded part 60B provided coaxially with the knob body part 60A at a proximal end part thereof. The threaded part 60B is formed corresponding to the focus ring locking threaded hole 50, and has a smaller diameter than the knob body part 60A. The focus ring locking knob 60 is attached to the focus ring 16 by screwing the threaded part 60B into the focus ring locking threaded hole 50. At this time, the focus ring locking knob 60 has the threaded part 60B screwed into the focus ring locking threaded hole 50 through the focus ring slit 54. In the present embodiment, the focus ring locking knob 60 is attached to the focus ring 16 also via a spacer 62 formed in a ring shape.

The locking mechanisms for the zoom ring 14 and the focus ring 16 in the lens apparatus 10 for a surveillance camera according to the present embodiment are configured as described above.

Next, the action of the locking mechanisms for the zoom ring 14 and the focus ring 16 in the lens apparatus 10 for a surveillance camera according to the present embodiment configured as described above will be described.

As described above, the zoom ring locking knob 56 is attached to the zoom ring 14, and the focus ring locking knob 60 is attached to the focus ring 16.

The zoom ring 14 is locked by tightening the zoom ring locking knob 56. The focus ring 16 is locked by tightening the focus ring locking knob 60. To be more specific, when the zoom ring locking knob 56 is tightened, a distance between the knob body part 56A of the zoom ring locking knob 56 and the zoom ring 14 is reduced, and the cover 42 is held between the knob body part 56A and the zoom ring 14. As a result, the zoom ring 14 is locked. Similarly, when the focus ring locking knob 60 is tightened, a distance between the knob body part 60A of the focus ring locking knob 60 and the focus ring 16 is reduced, and the cover 42 is held between the knob body part 60A and the focus ring 16. As a result, the focus ring 16 is locked.

The locked zoom ring 14 is unlocked by loosening the zoom ring locking knob 56. To be more specific, when the zoom ring locking knob 56 is loosened, the distance between the knob body part 56A of the zoom ring locking knob 56 and the zoom ring 14 is increased. As a result, the zoom ring 14 is unlocked. The zoom ring 14 can be thereby rotationally operated.

Similarly, the focus ring 16 is unlocked by loosening the focus ring locking knob 60. To be more specific, when the focus ring locking knob 60 is loosened, the distance between the knob body part 60A of the focus ring locking knob 60 and the focus ring 16 is increased. As a result, the focus ring 16 is unlocked. The focus ring 16 can be thereby rotationally operated.

In the lens apparatus 10 for a surveillance camera according to the present embodiment, the zoom ring 14 can be locked by tightening the zoom ring locking knob 56. Similarly, the focus ring 16 can be locked by tightening the focus ring locking knob 60. At this time, the ring is locked via the cover 42 attached to the lens barrel body 12 in the lens apparatus 10 for a surveillance camera according to the present embodiment. Thus, the lens barrel body 12 is not deformed. The optical performance is not affected even when the zoom ring 14 and the focus ring 16 are locked.

Also, the lens apparatus 10 can be easily assembled by simply screwing the threaded part 56B of the zoom ring locking knob 56 into the zoom ring locking threaded hole 46 and screwing the threaded part 60B of the focus ring locking knob 60 into the focus ring locking threaded hole 50.

Although the zoom ring 14 and the focus ring 16 are covered by the common cover 42 in the present embodiment, separate covers may respectively cover the rings.

Although the zoom ring locking knob 56 is attached to the zoom ring 14 via the spacer 58 in the present embodiment, the spacer 58 may not be attached when it is not necessary to adjust a screwing amount of the threaded part 56B into the zoom ring locking threaded hole 46 since the spacer 58 is used for adjusting the screwing amount. The same applies to the spacer 62 used for the focus ring locking knob 60.

What is claimed is:

1. A lens apparatus for a surveillance camera, comprising:
an operation ring which is rotatably provided on an outer periphery of a lens barrel body, a threaded hole being formed in an outer peripheral surface of the operation ring;
a cover which is provided on the lens barrel body to cover an outer periphery of the operation ring, a slit being circumferentially formed in a peripheral surface of the cover; and
a knob which has a body part and a threaded part and is attached to the operation ring by screwing the threaded part into the threaded hole through the slit,
wherein the operation ring is locked by tightening the knob and holding the cover between the operation ring and the body part of the knob.

2. The lens apparatus as in claim 1, wherein the cover is constructed and arranged to be rotationally fixed about the lens barrel body when the operation ring is locked and when the operation ring is unlocked.

3. A lens apparatus for a surveillance camera, comprising:
a first operation ring which is rotatably provided on an outer periphery of a lens barrel body, a first threaded hole being formed in an outer peripheral surface of the first operation ring;
a second operation ring which is rotatably provided on the outer periphery of the lens barrel body, a second threaded hole being formed in an outer peripheral surface of the second operation ring;
a cover which is provided on the lens barrel body to cover an outer periphery of the first operation ring and an outer periphery of the second operation ring, a first slit and a second slit being circumferentially formed in a peripheral surface of the cover;
a first knob which has a body part and a threaded part and is attached to the first operation ring by screwing the threaded part into the first threaded hole through the first slit; and
a second knob which has a body part and a threaded part and is attached to the second operation ring by screwing the threaded part into the second threaded hole through the second slit,
wherein the first operation ring is locked by tightening the first knob and holding the cover between the first operation ring and the body part of the first knob, and the second operation ring is locked by tightening the second knob and holding the cover between the second operation ring and the body part of the second knob.

4. The lens apparatus as in claim 3, wherein the cover is constructed and arranged to be rotationally fixed about the lens barrel body when the first operation ring is locked, when the first operation ring is unlocked, when the second operation ring is locked, and when the second operation ring is unlocked.

5. A lens apparatus comprising:
a lens barrel body fixed about an optical axis;
a first operation ring surrounding the lens barrel body about the optical axis, the first operation ring defining a first threaded hole oriented perpendicular to the optical axis and being constructed and arranged to (i) rotate about the optical axis, and (ii) translate a first lens within the lens barrel body along the optical axis;
a cover surrounding the lens barrel body and a portion of the first operation ring about the optical axis, the cover defining a first elongated slit oriented circumferentially about the optical axis and being constructed and arranged to be rotatably rigid about the optical axis with respect to the lens barrel body, wherein, when the first operation ring rotates about the optical axis, the first threaded hole traverses along the circumferentially oriented first elongated slit; and
a first ring locking knob having a first threaded portion and a first body portion, the first threaded portion being coaxial with the first body portion and being constructed and arranged to pass through the first elongated slit of the cover to mate the first threaded hole of the first operation ring,
wherein, when the first locking knob is tightened, the cover (i) is pinned between the first body portion of the first locking knob and the first operation ring and (ii) prevents the first operation ring from rotating about the optical axis, and
wherein, when the first locking knob is loosened, the cover (i) is unpinned between the first body portion of the first locking knob and the first operation ring and (ii) permits the first operation ring to rotate freely about the optical axis.

6. The lens apparatus as in claim 5, further comprising:
a second operation ring surrounding the lens barrel body about the optical axis, the second operation ring defining a second threaded hole oriented perpendicular to the optical axis and being constructed and arranged to (i) rotate about the optical axis, and (ii) translate a second lens within the lens barrel body along the optical axis,
wherein the cover additionally surrounds a portion of the second operation ring about the optical axis, the cover defining a second elongated slit oriented circumferentially about the optical axis, and
wherein, when the second operation ring rotates about the optical axis, the second threaded hole traverses along the circumferentially oriented second elongated slit; and
a second ring locking knob having a second threaded portion and a second body portion, the second threaded portion being coaxial with the second body portion and being constructed and arranged to pass through the second elongated slit of the cover to mate the second threaded hole of the second operation ring,
wherein, when the second locking knob is tightened, the cover (i) is pinned between the second body portion of the second locking knob and the second operation ring and (ii) prevents the second operation ring from rotating about the optical axis, and
wherein, when the second locking knob is loosened, the cover (i) is unpinned between the second body portion of the second locking knob and the first operation ring and (ii) permits the second operation ring to rotate freely about the optical axis.

7. The lens apparatus as in claim 6,
wherein the first threaded portion of the first locking knob is restricted from contacting and deforming the lens barrel body to maintain optical performance, and
wherein the second threaded portion of the second locking knob is restricted from contacting and deforming the lens barrel body to maintain optical performance.

8. The lens apparatus as in claim 5, wherein the first threaded portion of the first locking knob is restricted from contacting and deforming the lens barrel body to maintain optical performance.

* * * * *